(12) United States Patent
Yang (10) Patent No.: US 12,238,793 B2
(45) Date of Patent: Feb. 25, 2025

(54) RADIO BEARER ESTABLISHMENT METHOD AND APPARATUS, AND COMMUNICATION DEVICE

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 330 days.

(21) Appl. No.: 17/642,198

(22) PCT Filed: Sep. 23, 2019

(86) PCT No.: PCT/CN2019/107349
§ 371 (c)(1),
(2) Date: Mar. 10, 2022

(87) PCT Pub. No.: WO2021/056153
PCT Pub. Date: Apr. 1, 2021

(65) Prior Publication Data
US 2022/0322469 A1 Oct. 6, 2022

(51) Int. Cl.
*H04W 4/00* (2018.01)
*H04W 74/0808* (2024.01)
*H04W 76/14* (2018.01)

(52) U.S. Cl.
CPC ....... *H04W 76/14* (2018.02); *H04W 74/0808* (2013.01)

(58) Field of Classification Search
CPC . H04W 76/14; H04W 74/0808; H04W 76/11; H04W 76/12; H04W 4/70
See application file for complete search history.

(56) References Cited

U.S. PATENT DOCUMENTS 10,194,483 B2    1/2019   Lee et al.
10,201,003 B2*   2/2019   Guo ............... H04W 72/12
(Continued)

FOREIGN PATENT DOCUMENTS

CN    104247469 A    12/2014
CN    106455086 A    2/2017
(Continued)

OTHER PUBLICATIONS

3GPP TSG-RAN2 Meeting #106, R2-1907457, Reno, USA, May 13-17, 2019 Resubmission of R2-1904094 (Year: 2019).*
(Continued)

*Primary Examiner* — Atique Ahmed
(74) *Attorney, Agent, or Firm* — Arch & Lake LLP (57) ABSTRACT

A radio bearer establishment method. The method includes: sending a connection establishment request message, and the connection establishment request message includes: occupation information of a first logic channel identifier of a first user equipment (UE); receiving a connection establishment message returned on the basis of a connection establishment request, and the connection establishment message includes: at least one second logic channel identifier that is currently idle in both the first UE and a second UE, and is selected from the first logic channel identifier by the second UE on the basis of the occupation information; and establishing a radio bearer between the first UE and the second UE on the basis of the at least one second logic channel identifier.

16 Claims, 4 Drawing Sheets

(56) References Cited

U.S. PATENT DOCUMENTS

| | | | | |
|---|---|---|---|---|
| 10,299,251 | B2* | 5/2019 | Kwon | H04W 72/20 |
| 2016/0080531 | A1* | 3/2016 | Agiwal | H04W 4/70 |
| | | | | 370/474 |
| 2018/0368157 | A1* | 12/2018 | Jeon | H04W 72/044 |
| 2019/0261450 | A1* | 8/2019 | Adachi | H04W 76/11 |
| 2020/0084669 | A1* | 3/2020 | Belleschi | H04W 72/1263 |
| 2021/0368462 | A1* | 11/2021 | Bergquist | H04W 76/28 |

FOREIGN PATENT DOCUMENTS

| | | |
|---|---|---|
| CN | 107046697 A | 8/2017 |
| CN | 110225599 A | 9/2019 |
| EP | 3399784 A1 | 7/2018 |

OTHER PUBLICATIONS

International Search Report of PCT/CN2019/107349 dated Jun. 23, 2020 with English translation, (4p).

Huawei et al., "Support of RLC AM for Unicast and Related SLRB Configuration", Discussion and Decision, 3GPP TSG-RAN2 Meeting #106, R2-1907457, Reno, NV, May 13-17, 2019, (6p).

Vivo, "Packet Duplication Indication for PC5" Discussion and Decision, 3GPP TSG-RAN WG2 Meeting#101 R2-1802005, Athens, Greece, Feb. 14, 2018, (4p).

Notice of Allowance of Chinese Application No. 201980002066.5 dated Jun. 2, 2021 with English translation, (5p).

\* cited by examiner

RADIO BEARER ESTABLISHMENT METHOD AND APPARATUS, AND COMMUNICATION DEVICE

CROSS-REFERENCE

The present application is a U.S. National Stage of International Application No. PCT/CN2019/107349, filed on Sep. 23, 2019, the entire content of which is incorporated herein by reference for all purposes.

TECHNICAL FIELD

The present disclosure relates to, but is not limited to, the field of wireless communication technologies, and in particular relates to a method and apparatus for establishing a radio bearer, and a communication device.

BACKGROUND

Figure 1:
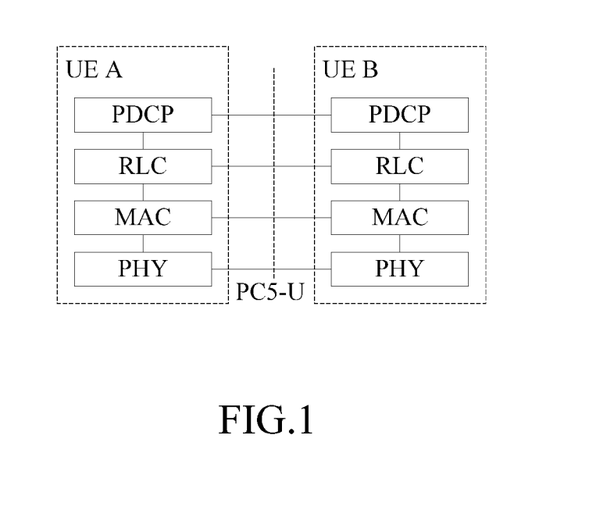
FIG. 1 is a schematic diagram showing a protocol stack of a sidelink communication manner according to an embodiment.

In the fourth generation (4G) mobile communication technologies, in order to support direct communication between user equipments (UEs), a sidelink communication manner is introduced. A protocol stack of the sidelink communication manner is shown in FIG. 1, and an interface between the UEs is PC-5. All sidelink communications adopt a broadcast mode, a radio link control (RLC) and a packet data convergence protocol (PDCP) adopt a transparent mode (TM), that is, without any processing on data packets.

On an air interface (Uu), the UE can send a RLC transmission status report of a logical channel to the network, including a confirmed acknowledged mode data protocol data unit (AMD PDU) sequence number, a unconfirmed AMD PDU sequence number and as on. A media access control (MAC) layer binds the RLC transmission status report to a MAC sub-header that carries a logical channel identifier. A network, after reception, confirms a logical channel corresponding to the RLC transmission status report according to the bound logical channel identifier.

In the fifth generation (5G) mobile communication technologies, the sidelink supports unicast transmission, and the RLC needs to support an acknowledge mode (AM), which may generate a feedback on the transmission of the data packets, and also needs to support to send the RLC transmission status report to a peer end. When the unicast transmission is established, a PC5 radio resource control (RRC) connection is first established between the UEs, which connection is used to exchange a sidelink connection establishment request message, a sidelink connection establishment message, a sidelink connection establishment completion message or a sidelink connection establishment rejection message.

SUMMARY

Embodiments of the present disclosure provide a method and apparatus for establishing a radio bearer.

According to a first aspect of the present disclosure, there is provided a method for establishing a radio bearer, wherein the method includes: sending a connection establishment request message, wherein the connection establishment request message includes: occupancy information of a first logical channel identifier of a first user equipment (UE); receiving a connection establishment message returned based on the connection establishment request, wherein the connection establishment message includes: at least one second logical channel identifier that is selected from the first logical channel identifier based on the occupancy information by a second UE and that is currently idle in both the first UE and the second UE; and establishing a radio bearer between the first UE and the second UE based on the at least one second logical channel identifier.

According to a second aspect of the present disclosure, there is provided a method for establishing a radio bearer, wherein the method includes: receiving a connection establishment request message, wherein the connection establishment request message includes: occupancy information of a first logical channel identifier of a first user equipment (UE); selecting at least one second logical channel identifier that is currently idle in both the first UE and a second UE from the first logical channel identifier based on the occupancy information; establishing a radio bearer between the first UE and the second UE based on the at least one second logical channel identifier; and sending a connection establishment message, wherein the connection establishment message includes: the at least one second logical channel identifier.

According to a third aspect of the present disclosure, there is provided a communication device, including a processor, a memory and an executable program stored on the memory and capable of being executed by the processor, wherein the processor executes steps of the method for establishing the radio bearer described in the first aspect or the second aspect when running the executable program.

It should be noted that the above general description and the following detailed description are merely exemplary and explanatory and should not be construed as limiting of the disclosure.

BRIEF DESCRIPTION OF THE DRAWINGS

The accompanying drawings, which are incorporated in and constitute a part of the disclosure, illustrate embodiments consistent with the present disclosure and, together with the description, serve to explain principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with some aspects of the embodiments of the present disclosure as recited in the appended claims.

The terms used in the embodiments of the present disclosure are merely for the purpose of describing particular embodiments and are not intended to limit the embodiments of the present disclosure. As used in the embodiments of the present disclosure and the appended claims, the singular forms "a", "the" and "said" are intended to include the plural forms as well, unless the context clearly indicates otherwise. It should also be understood that the term "and/or" as used herein refers to and includes any or all possible combinations of one or more of the associated listed items.

It should be understood that, although the terms first, second, third, etc. may be used in the embodiments of the present disclosure to describe various information, such information should not be limited to these terms. These terms are only used to distinguish the same type of information from each other. For example, without departing from the scope of the embodiments of the present disclosure, the first information may also be referred to as the second information, and similarly, the second information may also be referred to as the first information. Depending on the context, the word "if" as used herein can be interpreted as "upon" or "when" or "in response to determination".

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Execution subjects involved in the embodiments of the present disclosure include, but are not limited to, a user equipment (UE) supporting sidelink technologies, and the UE includes but is not limited to: user terminals, mobile terminals, vehicle-mounted communication devices, roadside infrastructure devices, smart wearable devices, tablet computers, user nodes, etc.

An application scenario of the embodiments of the present disclosure is that when the UE establishes a logical channel, a logical channel identifier is allocated by the UE itself. For two UEs performing the sidelink communication, the logical channel of the peer end may use a different logical channel identifier. If the UE sends an RLC transmission status report to the peer end UE, the peer end UE may obtain an incorrect correspondence between the RLC transmission status report and the logical channel according to the logical channel identifier.

Figure 2:
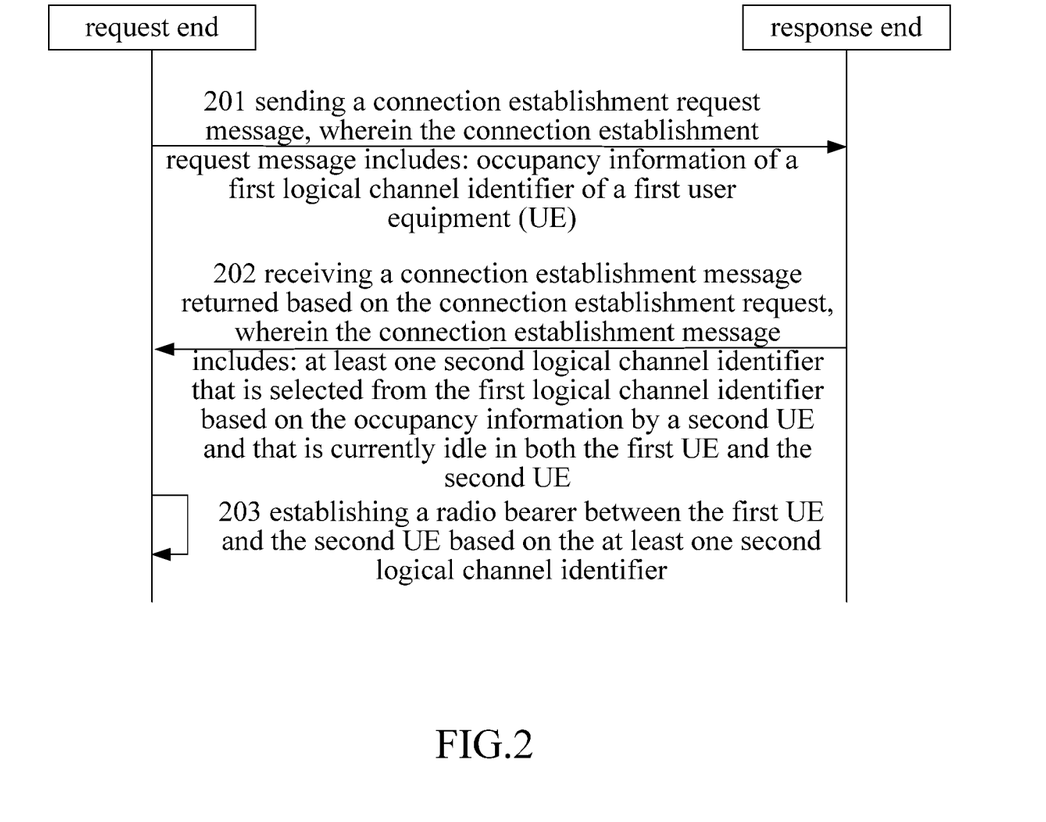
FIG. 2 is a schematic flowchart showing a method for establishing a radio bearer according to an embodiment.

As shown in FIG. 2, the embodiments of the present disclosure provide a method for establishing a radio bearer. The method for establishing the radio bearer can be applied to a sidelink connection establishment request end, and the method includes:

in step 201, a connection establishment request message is sent, and the connection establishment request message includes: occupancy information of a first logical channel identifier of a first user equipment (UE);

in step 202, a connection establishment message returned based on the connection establishment request, and the connection establishment message includes: at least one second logical channel identifier that is selected from the first logical channel identifier based on the occupancy information by a second UE and that is currently idle in both the first UE and the second UE; and in step 203, a radio bearer between the first UE and the second UE is established based on the at least one second logical channel identifier.

The first UE and the second UE may be UEs at both ends of the sidelink, the first UE may be a connection establishment request end, that is, a sending end of the connection establishment request message; and the second UE may be a connection establishment response end, that is, a receiving end of the connection establishment request message. The connection establishment request message may be a sidelink connection establishment request message, and the connection establishment message may be a sidelink connection establishment message.

The first UE may set the occupancy information of its own first logical channel identifier in the connection establishment request message, and send the connection establishment request message to the second UE. The connection establishment request message may be transmitted by the first UE using a PC5 RRC connection established between the first UE and the second UE.

The first logical channel identifier may be all logical channel identifiers used for the sidelink in the first UE. The occupancy information of the first logical channel identifier may include: occupied logical channel identifiers and idle logical channel identifiers in the first UE; or may only include idle logical channel identifiers, and so on.

The receiving end of the connection establishment request message, that is, the second UE, after receiving the connection establishment request message, can determine the idle logical channel identifiers in the first UE according to the occupancy information of the first logical channel identifier, and determine the second logical channel identifier that is idle in both the first UE and the second UE in conjunction with its own idle logical channel identifiers. There may be one or more second logical channel identifiers.

In some embodiments of the present disclosure, the first UE may send three idle logical channel identifiers "1", "2" and "4" to the second UE through the connection establishment request message. In the second UE, "2", "3" and "4" are idle logical channel identifiers, and the second UE determines "2" and "4" as the second logical channel identifiers, that is, the second logical channel identifier is one or more of the currently idle (i.e., unoccupied) logical channel identifiers among the first logical channel identifier allocated by the first UE.

After the second UE determines the at least one second logical channel identifier, the second logical channel identifier is used to establish the radio bearer of the sidelink between the first UE and the second UE, and the second logical channel identifier is used as an identifier of the established radio bearer. The at least one second logical channel identifier includes: one or more second logical channel identifiers.

In some embodiments of the present disclosure, using one second logical channel identifier to establish the radio bearer specifically includes: establishing the radio bearer based on a radio bearer configuration, that is, using a data transmission mode, a data analysis mode, etc. configured in the radio bearer configuration to process data. A correspondence between a logical channel corresponding to the second logical channel identifier and the established radio bearer is established. During data transmission, data on the logical channel identified by the second logical channel identifier is mapped to the established radio bearer, and is transmitted by the radio bearer.

One second logical channel identifier corresponds to one radio bearer. The second UE may send the determined at least one second logical channel identifier to the first UE through the connection establishment message.

The connection establishment message is a response message to the connection establishment request message sent by the first UE, and is a message that the second UE replies to the first UE after receiving the connection establishment request message.

After acquiring the at least one second logical channel identifier carried in the connection establishment message, the first UE uses the second logical channel identifier to establish the radio bearer of the sidelink between the first UE and the second UE.

In this way, the UEs at both ends of the link mutually determine idle logical channel identifiers when establishing the radio bearer, and the logical channel identifier that is idle in the UEs at both ends of the radio bearer is used to establish the radio bearer, thereby reducing a probability of establishing the radio bearer by the user equipment at one end using the logical channel identifier that has been occupied in the peer end, and improving a success rate of establishing the radio bearer.

In an embodiment, the connection establishment message further includes: at least one correspondence, and the correspondence is a one-to-one correspondence between one second logical channel identifier and one radio bearer configuration; and the establishing the radio bearer of the sidelink between the first UE and the second UE based on the at least one second logical channel identifier includes: selecting a radio bearer configuration corresponding to the second logical channel identifier according to each correspondence, respectively, and establishing the radio bearer of the sidelink between the first UE and the second UE.

An allocation rule may be preset, and after the second UE determines the at least one second logical channel identifier, one radio bearer configuration is allocated to each second logical channel identifier according to the preset allocation rule, respectively. The preset allocation rule is used to allocate to each second logical channel identifier one radio bearer configuration in a one-to-one correspondence with each second logical channel identifier, respectively, based on the at least one second logical channel identifier and the at least one radio bearer configuration. The preset allocation rule may be determined according to the number of the second logical channel identifiers and the number of the radio bearer configurations, or may be set according to actual requirements and the like. In some embodiments of the present disclosure, the allocation of the radio bearer configurations through the preset allocation rule may be random allocation, that is, one radio bearer configuration in the one-to-one correspondence with each second logical channel identifier is randomly allocated to each second logical channel identifier. Alternatively, according an arrangement order of the second logical channel identifiers and an arrangement order of the radio bearer configurations, the allocation is performed in a one-to-one correspondence manner based on the arrangement orders. Configuration content in the radio bearer configuration may include: an RLC transmission mode, a mapped Quality of Service (QoS) flow identifier, a PDCP sequence number (SN) length, and the like.

There may be one or more radio bearer configurations, which can be acquired in a preset manner and/or can be acquired in a manner in which the first UE and the second UE perform interactive transmission.

The number of the second logical channel identifiers and the number of the radio bearer configurations may or may not be the same. Since the second logical channel identifier and the radio bearer configuration have the one-to-one correspondence, if the number of the second logical channel identifiers is greater than the number of the radio bearer configurations, there occurs a case where one or more second logical channel identifiers cannot be allocated with the radio bearer configurations; and if the number of the second logical channel identifiers is less than the number of the radio bearer configurations, there occurs a case where one or more radio bearer configurations do not have corresponding second logical channel identifiers.

There may be one or more second logical channel identifiers allocated with the radio bearer configuration. The second UE may select the radio bearer configuration corresponding to the second logical channel identifier, and establish the radio bearer of the sidelink between the first UE and the second UE. There may be one or more radio bearers established by the second UE, and each radio bearer has a corresponding second logical channel identifier, respectively.

The second UE may establish the one-to-one correspondence between each second logical channel identifier and the respective radio bearer configuration, respectively, according to the radio bearer configurations each allocated to each second logical channel identifier to obtain the at least one correspondence. The at least one correspondence is carried in the connection establishment message and sent to the first UE.

The correspondence in the connection establishment message can take different forms. In some embodiments of the present disclosure, the different forms of the correspondence may be: placing the corresponding second logical channel identifiers in sequence according to the arrangement order of the radio bearer configurations. If the corresponding second logical channel identifier is not placed in an arrangement position of a radio bearer configuration, it means that this radio bearer configuration is allocated to the second logical channel identifier. The different forms of the correspondence may also be: a form of correspondence between identifier information of the radio bearer configuration and the second logical channel identifier, that is, one piece of identifier information is set for each radio bearer configuration, and the identifier information of each radio bearer configuration corresponds to one second logical channel identifier.

After receiving the connection establishment message, the first UE selects each second logical channel identifier and the radio bearer configuration corresponding to the second logical channel identifier by using the correspondence in the connection establishment message, and establishes the radio bearer of the sidelink between the first UE and the second UE. There may be one or more established radio bearers, each with a corresponding second logical channel identifier.

In some embodiments of the present disclosure, taking the second UE determining "2" and "4" as the second logical channel identifiers as an example, there are three radio bearer configurations with serial numbers A, B and C, respectively, and the configuration contents are shown in table 1:

TABLE 1

| | radio bearer configuration content | | |
|---|---|---|---|
| radio bearer configuration serial number | radio link control (RLC) transmission mode | mapped Quality of Service (QoS) flow identifier | packet data convergence protocol sequence number (PDCP SN) length |
| A | Unacknowledge mode (UM) | 1, 3 | 12 bits |
| B | Acknowledge mode (AM) | 2, 4 | 8 bits |
| C | Unacknowledge mode (UM) | 5 | 8 bits |

The second UE may allocate the radio bearer configuration A to the second logical channel identifier "2" and allocate the radio bearer configuration B to the second logical channel identifier "4", and establish the radio bearer. The radio bearer configuration C is not allocated to the second logical channel identifier.

The second UE may send the one-to-one correspondence between the radio bearer configuration A and the second logical channel identifier "2", and the one-to-one correspondence between the radio bearer configuration B and the second logical channel identifier "4" to the first UE through the connection establishment message.

The first UE establishes the radio bearer according to the same one-to-one correspondence. In this way, the logical channel identifiers for the radio bearers established by means of the radio bearer configuration A in the first UE and the second UE are both "2", and the logical channel identifiers for the radio bearers established by means of the radio bearer configuration B in the first UE and the second UE are both "4", which achieves consistency of the logical channel identifiers of the radio bearers.

Since the first UE and the second UE adopt the same correspondence between the second logical channel identifier and the radio bearer configuration to establish the radio bearer, and one radio bearer configuration corresponds to one radio bearer, the logical channel identifiers for the same radio bearer in the first UE and the second UE are the same. In this way, the consistency of the logical channel identifiers for the radio bearers between the first UE and the second UE is realized, and misjudgment of a transmission status due to inconsistent logical channel identifiers corresponding to the radio bearers at both ends during a process of the UE sending the RLC transmission status report to the peer end UE is reduced.

In an embodiment, the connection establishment request message carries a radio bearer configuration of a radio bearer to be established; and the radio bearer configuration in the correspondence is the radio bearer configuration of the radio bearer to be established included in the sidelink establishment request message.

Here, the radio bearer configuration may be provided by the first UE, and at least one radio bearer configuration may be carried in the connection establishment request message by the first UE.

After receiving the connection establishment request message, the second UE acquires the at least one radio bearer configuration, allocates the radio bearer configuration for each second logical channel identifier, and establishes the one-to-one correspondence between the second logical channel identifier and the allocated radio bearer configuration.

In an embodiment, the method further includes: when the radio bearer configuration included in the connection establishment request message does not have the correspondence, establishing no radio bearer corresponding to the radio bearer configuration.

When the number of the radio bearer configurations included in the connection establishment request message is greater than the number of the second logical channel identifiers, the radio bearer configurations exceeding the number of the second logical channel identifiers cannot be allocated to the second logical channel identifiers. The second UE may reject the radio bearer of the radio bearer configuration that is not allocated to the second logical channel identifier.

After acquiring at least one one-to-one correspondence between the second logical channel identifier and the radio bearer configuration from the connection establishment message, the first UE determines the radio bearer configuration having the corresponding second logical channel identifier, and establishes the corresponding radio bearer. For the radio bearer configuration that does not have the corresponding second logical channel identifier, the corresponding radio bearer is not established.

In some embodiments of the present disclosure, taking the second UE determining "2" and "4" as the second logical channel identifiers, and the established correspondences between A and "2" and B and "4" among the radio bearer configurations A, B, and C as an example, the radio bearer configuration C is not allocated to the second logical channel identifier, therefore, the second UE may reject the radio bearer using the radio bearer configuration C, and the first UE may not establish the radio bearer using the radio bearer configuration C.

In an embodiment, the occupancy information of the logical channel identifier of the first UE includes: an idle logical channel identifier in the first UE.

Here, the first UE may only send its idle logical channel identifiers to the second UE. The second UE may directly determine its own idle logical channel identifier from the idle logical channel identifiers of the first UE, and determine it as the second logical channel identifier.

Figure 3:
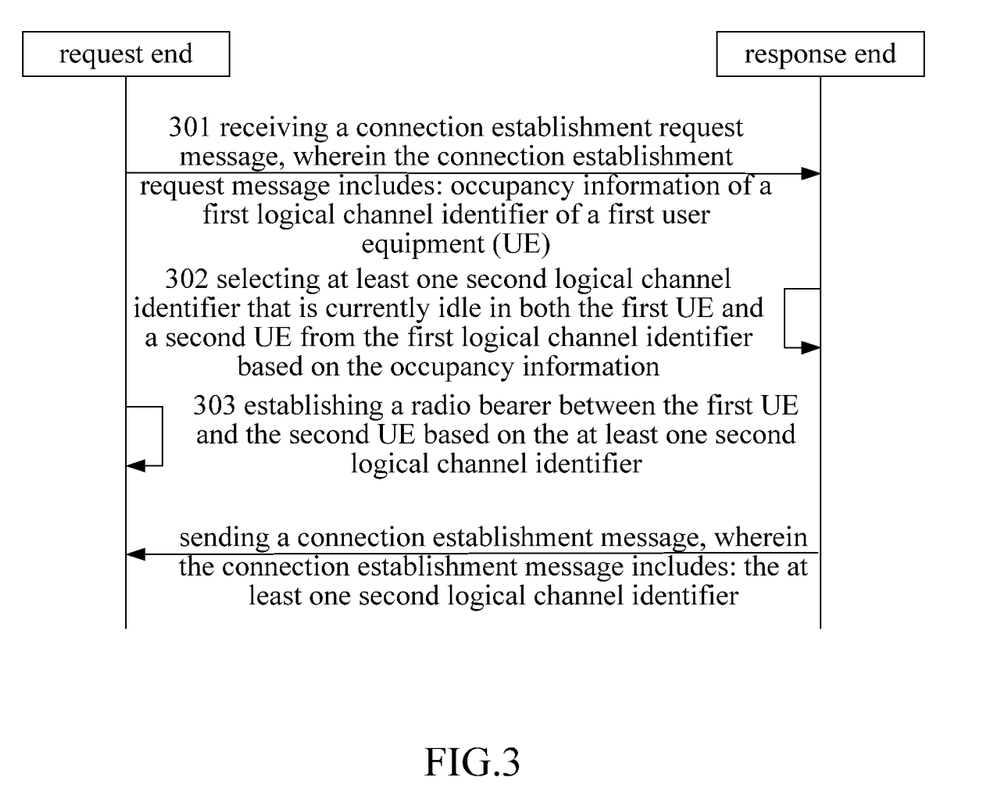
FIG. 3 is a schematic flowchart showing another method for establishing a radio bearer according to an embodiment.

As shown in FIG. 3, the embodiments of the present disclosure provide a method for establishing a radio bearer. The method for establishing the radio bearer can be applied to a connection establishment response end, and the method includes:

in step 301, a connection establishment request message is received, and the connection establishment request message includes: occupancy information of a first logical channel identifier of a first user equipment (UE);

in step 302, at least one second logical channel identifier that is currently idle in both the first UE and a second UE is selected from the first logical channel identifier based on the occupancy information;

in step 303, a radio bearer between the first UE and the second UE is established based on the at least one second logical channel identifier; and in step 304, a connection establishment message is sent, and the connection establishment message includes: the at least one second logical channel identifier.

The first UE and the second UE may be UEs at both ends of the sidelink, the first UE may be a connection establishment request end, that is, a sending end of the connection establishment request message; and the second UE may be a connection establishment response end, that is, a receiving end of the connection establishment request message. The connection establishment request message may be a sidelink connection establishment request message, and the connection establishment message may be a sidelink connection establishment message.

The first UE may set the occupancy information of its own first logical channel identifier in the connection establishment request message, and send the connection establishment request message to the second UE. The connection establishment request message may be transmitted by the first UE using a PC5 RRC connection established between the first UE and the second UE.

The first logical channel identifier may be all logical channel identifiers used for the sidelink in the first UE. The occupancy information of the first logical channel identifier may include: occupied logical channel identifiers and idle logical channel identifiers in the first UE; or may only include idle logical channel identifiers, and so on.

The receiving end of the connection establishment request message, that is, the second UE, after receiving the connection establishment request message, can determine the idle logical channel identifiers in the first UE according to the occupancy information of the first logical channel identifier, and determine the second logical channel identifier that is idle in both the first UE and the second UE in conjunction with its own idle logical channel identifiers. There may be one or more second logical channel identifiers.

In some embodiments of the present disclosure, the first UE may send three idle logical channel identifiers "1", "2" and "4" to the second UE through the connection establishment request message. In the second UE, "2", "3" and "4" are idle logical channel identifiers, and the second UE determines "2" and "4" as the second logical channel identifiers, that is, the second logical channel identifier is one or more of the currently idle (i.e., unoccupied) logical channel identifiers among the first logical channel identifier allocated by the first UE.

After the second UE determines the at least one second logical channel identifier, the second logical channel identifier is used to establish the radio bearer of the sidelink between the first UE and the second UE, and the second logical channel identifier is used as an identifier of the established radio bearer. The at least one second logical channel identifier includes: one or more second logical channel identifiers.

In some embodiments of the present disclosure, using one second logical channel identifier to establish the radio bearer specifically includes: establishing the radio bearer based on a radio bearer configuration, that is, using a data transmission mode, a data analysis mode, etc. configured in the radio bearer configuration to process data. A correspondence between a logical channel corresponding to the second logical channel identifier and the established radio bearer is established. During data transmission, data on the logical channel identified by the second logical channel identifier is mapped to the established radio bearer, and is transmitted by the radio bearer.

One second logical channel identifier corresponds to one radio bearer. The second UE may send the determined at least one second logical channel identifier to the first UE through the connection establishment message.

The connection establishment message is a response message to the connection establishment request message sent by the first UE, and is a message that the second UE replies to the first UE after receiving the connection establishment request message.

After acquiring the at least one second logical channel identifier carried in the connection establishment message, the first UE uses the second logical channel identifier to establish the radio bearer of the sidelink between the first UE and the second UE.

In this way, the UEs at both ends of the link mutually determine idle logical channel identifiers when establishing the radio bearer, and the logical channel identifier that is idle in the UEs at both ends of the radio bearer is used to establish the radio bearer, thereby reducing a probability of establishing the radio bearer by the user equipment at one end using the logical channel identifier that has been occupied in the peer end, and improving a success rate of establishing the radio bearer.

In an embodiment, the connection establishment request message carries a radio bearer configuration of a radio bearer to be established; and the method further includes: allocating one radio bearer configuration to each second logical channel identifier, respectively.

An allocation rule may be preset, and after the second UE determines the at least one second logical channel identifier, one radio bearer configuration is allocated to each second logical channel identifier according to the preset allocation rule, respectively. The preset allocation rule is used to allocate to each second logical channel identifier one radio bearer configuration in a one-to-one correspondence with each second logical channel identifier, respectively, based on the at least one second logical channel identifier and the at least one radio bearer configuration. The preset allocation rule may be determined according to the number of the second logical channel identifiers and the number of the radio bearer configurations, or may be set according to actual requirements and the like. In some embodiments of the present disclosure, the allocation of the radio bearer configurations through the preset allocation rule may be random allocation, that is, one radio bearer configuration in the one-to-one correspondence with each second logical channel identifier is randomly allocated to each second logical channel identifier. Alternatively, according an arrangement order of the second logical channel identifiers and an arrangement order of the radio bearer configurations, the allocation is performed in a one-to-one correspondence manner based on the arrangement orders. Configuration content in the radio bearer configuration may include: an RLC transmission mode, a mapped Quality of Service (QoS) flow identifier, a PDCP sequence number (SN) length, and the like.

Here, the radio bearer configuration may be provided by the first UE, and at least one radio bearer configuration may be carried in the connection establishment request message by the first UE.

After receiving the connection establishment request message, the second UE acquires the at least one radio bearer configuration, and allocates a radio bearer configuration to each second logical channel identifier.

The number of the second logical channel identifiers and the number of the radio bearer configurations may or may not be the same. Since the second logical channel identifier and the radio bearer configuration have the one-to-one correspondence, if the number of the second logical channel identifiers is greater than the number of the radio bearer configurations, there occurs a case where one or more second logical channel identifiers cannot be allocated with the radio bearer configurations; and if the number of the second logical channel identifiers is less than the number of the radio bearer configurations, there occurs a case where one or more radio bearer configurations do not have corresponding second logical channel identifiers.

There may be one or more second logical channel identifiers allocated with the radio bearer configuration. The second UE may select the radio bearer configuration corresponding to the second logical channel identifier, and establish the radio bearer of the sidelink between the first UE and the second UE. There may be one or more radio bearers established by the second UE, and each radio bearer has a corresponding second logical channel identifier, respectively.

In an embodiment, the connection establishment request message further includes: a one-to-one correspondence between each second logical channel identifier and each radio bearer configurations allocated to each second logical channel identifier.

The second UE may establish the one-to-one correspondence between each second logical channel identifier and the respective radio bearer configuration, respectively, according to the radio bearer configurations each allocated to each second logical channel identifier to obtain the at least one correspondence. The at least one correspondence is carried in the connection establishment message and sent to the first UE.

The correspondence in the connection establishment message can take different forms. In some embodiments of the present disclosure, the different forms of the correspondence may be: placing the corresponding second logical channel identifiers in sequence according to the arrangement order of the radio bearer configurations. If the corresponding second logical channel identifier is not placed in an arrangement position of a radio bearer configuration, it means that this radio bearer configuration is allocated to the second logical channel identifier. The different forms of the correspondence may also be: a form of correspondence between identifier information of the radio bearer configuration and the second logical channel identifier, that is, one piece of identifier information is set for each radio bearer configuration, and the identifier information of each radio bearer configuration corresponds to one second logical channel identifier.

After receiving the connection establishment message, the first UE selects each second logical channel identifier and the radio bearer configuration corresponding to the second logical channel identifier by using the correspondence in the connection establishment message, and establishes the radio bearer of the sidelink between the first UE and the second UE. There may be one or more established radio bearers, each with a corresponding second logical channel identifier.

In some embodiments of the present disclosure, taking the second UE determining "2" and "4" as the second logical channel identifiers as an example, there are three radio bearer configurations with serial numbers A, B and C, respectively, and the configuration contents are shown in the above table 1.

The second UE may allocate the radio bearer configuration A to the second logical channel identifier "2" and allocate the radio bearer configuration B to the second logical channel identifier "4", and establish the radio bearer. The radio bearer configuration C is not allocated to the second logical channel identifier.

The second UE may send the one-to-one correspondence between the radio bearer configuration A and the second logical channel identifier "2", and the one-to-one correspondence between the radio bearer configuration B and the second logical channel identifier "4" to the first UE through the connection establishment message.

The first UE establishes the radio bearer according to the same one-to-one correspondence. In this way, the logical channel identifiers for the radio bearers established by means of the radio bearer configuration A in the first UE and the second UE are both "2", and the logical channel identifiers for the radio bearers established by means of the radio bearer configuration B in the first UE and the second UE are both "4", which achieves consistency of the logical channel identifiers of the radio bearers.

Since the first UE and the second UE adopt the same correspondence between the second logical channel identifier and the radio bearer configuration to establish the radio bearer, and one radio bearer configuration corresponds to one radio bearer, the logical channel identifiers for the same radio bearer in the first UE and the second UE are the same. In this way, the consistency of the logical channel identifiers for the radio bearers between the first UE and the second UE is realized, and misjudgment of a transmission status due to inconsistent logical channel identifiers corresponding to the radio bearers at both ends during a process of the UE sending the RLC transmission status report to the peer end UE is reduced.

In an embodiment, the method further includes: when the radio bearer configuration is not allocated to the corresponding second logical channel identifier, rejecting the radio bearer corresponding to the radio bearer configuration.

When the number of the radio bearer configurations included in the connection establishment request message is greater than the number of the second logical channel identifiers, the radio bearer configurations exceeding the number of the second logical channel identifiers cannot be allocated to the second logical channel identifiers. The second UE may reject the radio bearer of the radio bearer configuration that is not allocated to the second logical channel identifier.

After acquiring at least one one-to-one correspondence between the second logical channel identifier and the radio bearer configuration from the connection establishment message, the first UE determines the radio bearer configuration having the corresponding second logical channel identifier, and establishes the corresponding radio bearer. For the radio bearer configuration that does not have the corresponding second logical channel identifier, the corresponding radio bearer is not established.

In some embodiments of the present disclosure, taking the second UE determining "2" and "4" as the second logical channel identifiers, and the established correspondences between A and "2" and B and "4" among the radio bearer configurations A, B, and C as an example, the radio bearer configuration C is not allocated to the second logical channel identifier, therefore, the second UE may reject the radio bearer using the radio bearer configuration C, and the first UE may not establish the radio bearer using the radio bearer configuration C.

In an embodiment, the occupancy information of the logical channel identifier of the first UE includes: an idle logical channel identifier in the first UE.

When the number of the radio bearer configurations included in the connection establishment request message is greater than the number of the second logical channel identifiers, the radio bearer configurations exceeding the number of the second logical channel identifiers cannot be allocated to the second logical channel identifiers. The second UE may reject the radio bearer of the radio bearer configuration that is not allocated to the second logical channel identifier.

After acquiring at least one one-to-one correspondence between the second logical channel identifier and the radio bearer configuration from the connection establishment message, the first UE determines the radio bearer configuration having the corresponding second logical channel identifier, and establishes the corresponding radio bearer. For the radio bearer configuration that does not have the corresponding second logical channel identifier, the corresponding radio bearer is not established.

In some embodiments of the present disclosure, taking the second UE determining "2" and "4" as the second logical channel identifiers, and the established correspondences between A and "2" and B and "4" among the radio bearer configurations A, B, and C as an example, the radio bearer configuration C is not allocated to the second logical channel identifier, therefore, the second UE may reject the radio bearer using the radio bearer configuration C, and the first UE may not establish the radio bearer using the radio bearer configuration C.

A specific example is provided below in conjunction with any of the above-mentioned embodiments.

Figure 4:
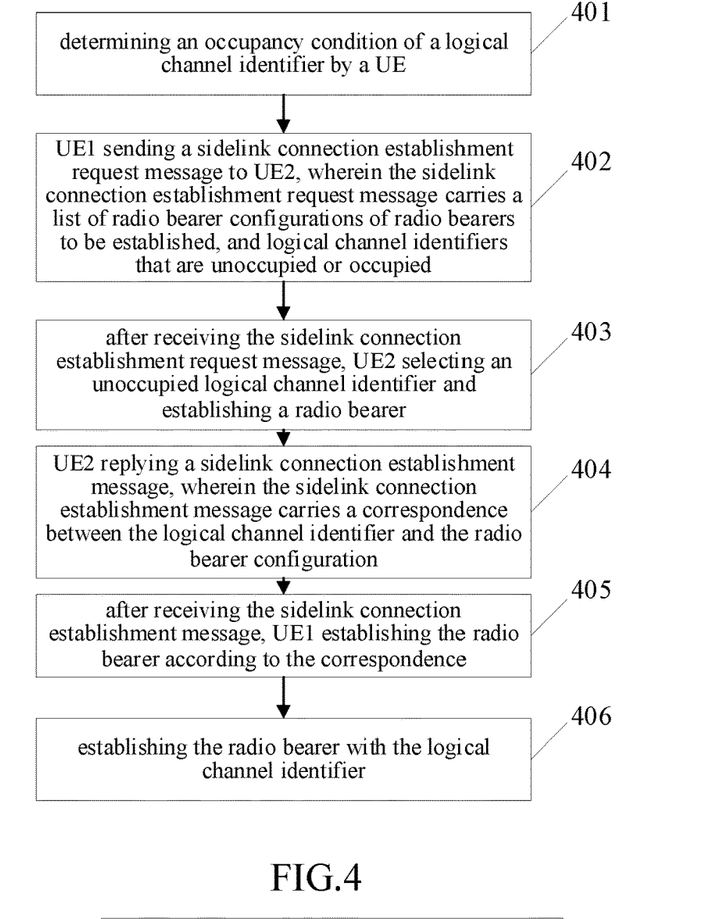
FIG. 4 is a schematic flowchart showing steps of establishing a radio bearer by a user equipment according to an embodiment.

As shown in FIG. 4, steps of establishing a radio bearer by UE1 and UE2 include:
- in step 401, UE1 and UE2 each confirm which logical channel identifiers are not occupied or have been occupied;
- in step 402, UE1 sends a sidelink connection establishment request message to UE2, and the sidelink connection establishment request message carries a list of radio bearer configurations of radio bearers to be established, and logical channel identifiers that are unoccupied or occupied;
- in step 403, after receiving the sidelink connection establishment request message, UE2 selects an unoccupied logical channel identifier and establishes the radio bearer;
- in step 404, UE2 replies a sidelink connection establishment message, and the sidelink connection establishment message carries a correspondence between the logical channel identifier and the radio bearer configuration;
- in step 405, after receiving the sidelink connection establishment message, UE1 establishes the radio bearer according to the correspondence; and
- in step 406, if a radio bearer configuration does not have a corresponding logical channel identifier, it means that UE2 rejects to establish the radio bearer, and UE1 only establishes the radio bearer with the logical channel identifier.

According to the steps of establishing the radio bearer in FIG. 4, for example, taking there being 5 logical channel identifiers 1, 2, 3, 4 and 5 in UE1 and 5 logical channel identifiers 1, 2, 3, 4 and 5 in UE2 an example:
- in UE1, the occupied logical channel identifiers are 3 and 5, and the unoccupied logical channel identifiers are 1, 2, and 4;
- in UE2, the occupied logical channel identifiers are 1 and 5, and the unoccupied logical channel identifiers are 2, 3, and 4;
- UE1 sends the sidelink connection establishment request message to UE2, which carries the unoccupied logical channel identifiers 1, 2, and 4, and the list of radio bearer configurations of the radio bearers to be established is shown in the above table 1;
- after receiving the sidelink connection establishment request message, UE2 establishes the following radio bearer according to an occupancy condition of the internal logical channel identifiers:
  A: RLC transmission mode: UM, mapped QoS flow identifier: 1, 3, PDCP SN length: 12 bits, and logical channel identifier: 2;
  B: RLC transmission mode: AM, mapped QoS flow identifier: 2, 4, PDCP SN length: 8 bits, and logical channel identifier: 4.

UE2 sends the sidelink connection establishment message to UE1, which carries the correspondence between the radio bearer and the logical channel identifier, and the correspondence is:
  A: logical channel identifier 2;
  B: logical channel identifier 4;
  C: No logical channel identifier.
  UE1 establishes the following radio bearer:
  RLC transmission mode: UM, mapped QoS flow identifier: 1, 3, PDCP SN length: 12 bits, and logical channel identifier: 2;
  RLC transmission mode: AM, mapped QoS flow identifier: 2, 4, PDCP SN length: 8 bits, and logical channel identifier: 4.

Figure 5:
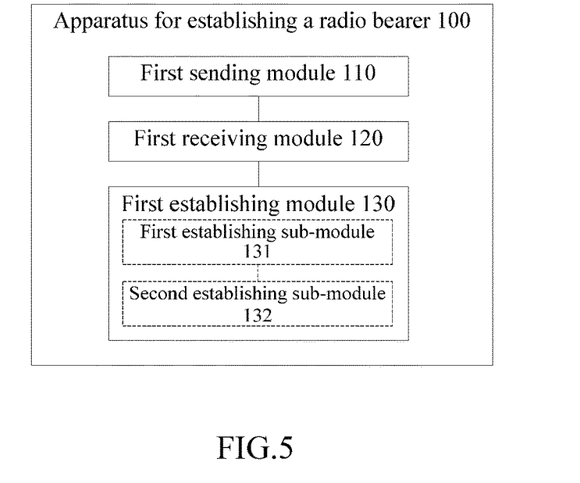
FIG. 5 is a block diagram showing an apparatus for establishing a radio bearer according to an embodiments of the present disclosure.

The embodiments of the present disclosure further provide an apparatus 100 for establishing a radio bearer, which can be applied to a sidelink connection establishment request end. As shown in FIG. 5, the apparatus 100 includes: a first sending module 110, a first receiving module 120 and the first establishing module 130.

The first sending module 100 is configured to send a connection establishment request message, and the connection establishment request message includes: occupancy information of a first logical channel identifier of a first user equipment (UE).

The first receiving module 120 is configured to receive a connection establishment message returned based on the connection establishment request, and the connection establishment message includes: at least one second logical channel identifier that is selected from the first logical channel identifier based on the occupancy information by a second UE and that is currently idle in both the first UE and the second UE.

The first establishing module 130 is configured to establish a radio bearer between the first UE and the second UE based on the at least one second logical channel identifier.

In an embodiment, the connection establishment message further includes: a one-to-one correspondence between the at least one second logical channel identifier and a radio bearer configuration; and
the first establishing module 130 includes:
a first establishing sub-module 131, configured to select a radio bearer configuration corresponding to the second logical channel identifier according to each correspondence, respectively, and establish the radio bearer between the first UE and the second UE.

In an embodiment, a radio bearer configuration of a radio bearer to be established is carried in the connection establishment request message; and the radio bearer configuration in the correspondence is the radio bearer configuration of the radio bearer to be established included in the connection establishment request message.

In an embodiment, the first establishing module 130 includes:

a second establishing sub-module 132, configured to establish no radio bearer corresponding to a radio bearer configuration when the radio bearer configuration included in the connection establishment request message does not have the correspondence.

In an embodiment, the occupancy information of the logical channel identifier of the first UE includes: an idle logical channel identifier in the first UE.

Figure 6:
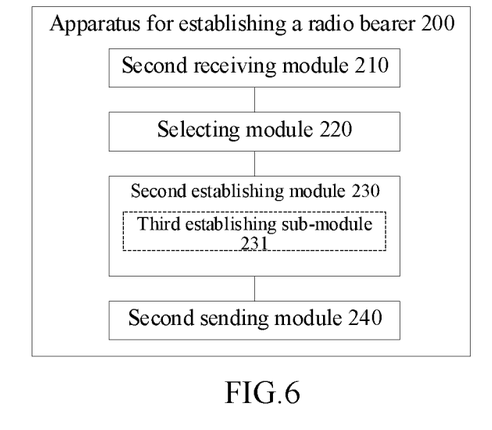
FIG. 6 is a block diagram showing another apparatus for establishing a radio bearer according to an embodiments of the present disclosure.

The embodiments of the present disclosure further provide an apparatus 200 for establishing a radio bearer, which can be applied to a connection establishment response end. As shown in FIG. 6, the apparatus 200 includes: a second receiving module 210, a selecting module 220, a second establishing module 230 and a second sending module 240.

The second receiving module 210 is configured to receive a connection establishment request message, and the connection establishment request message includes: occupancy information of a first logical channel identifier of a first user equipment (UE).

The selecting module 220 is configured to select at least one second logical channel identifier that is currently idle in both the first UE and a second UE from the first logical channel identifier based on the occupancy information.

The second establishing module 230 is configured to establish a radio bearer between the first UE and the second UE based on the at least one second logical channel identifier.

The second sending module 240 is configured to send a connection establishment message, and the connection establishment message includes: the at least one second logical channel identifier.

In an embodiment, a radio bearer configuration of a radio bearer to be established is carried in the connection establishment request message; and the apparatus further includes:

an allocating module, configured to allocate one radio bearer configuration to each second logical channel identifier, respectively.

In an embodiment, the connection establishment request message further includes: a one-to-one correspondence between each second logical channel identifier and each radio bearer configuration allocated to each second logical channel identifier.

In an embodiment, the second establishing module 230 further includes:

a third establishing sub-module 231, configured to reject a radio bearer corresponding to the radio bearer configuration, when a radio bearer configuration is not allocated to a corresponding second logical channel identifier.

In an embodiment, the occupancy information of the logical channel identifier of the first UE includes: an idle logical channel identifier in the first UE.

In the embodiments of the present disclosure, the generating module 110, the first sending module 120, the first determining module 130, the receiving module 210, the second determining module 220, the second sending module 230, etc. may be implemented with one or more central processing units (CPUs), graphics processing units (GPUs), baseband processors (BPs), application specific integrated circuits (ASICs), digital signal processors (DSPs), programmable logic devices (PLDs), complex programmable logic devices (CPLDs), field-programmable gate arrays (FPGAs), general-purpose processors, controllers, micro controller units (MCUs), microprocessors or other electronic components, and configured to perform the above method.

Figure 7:
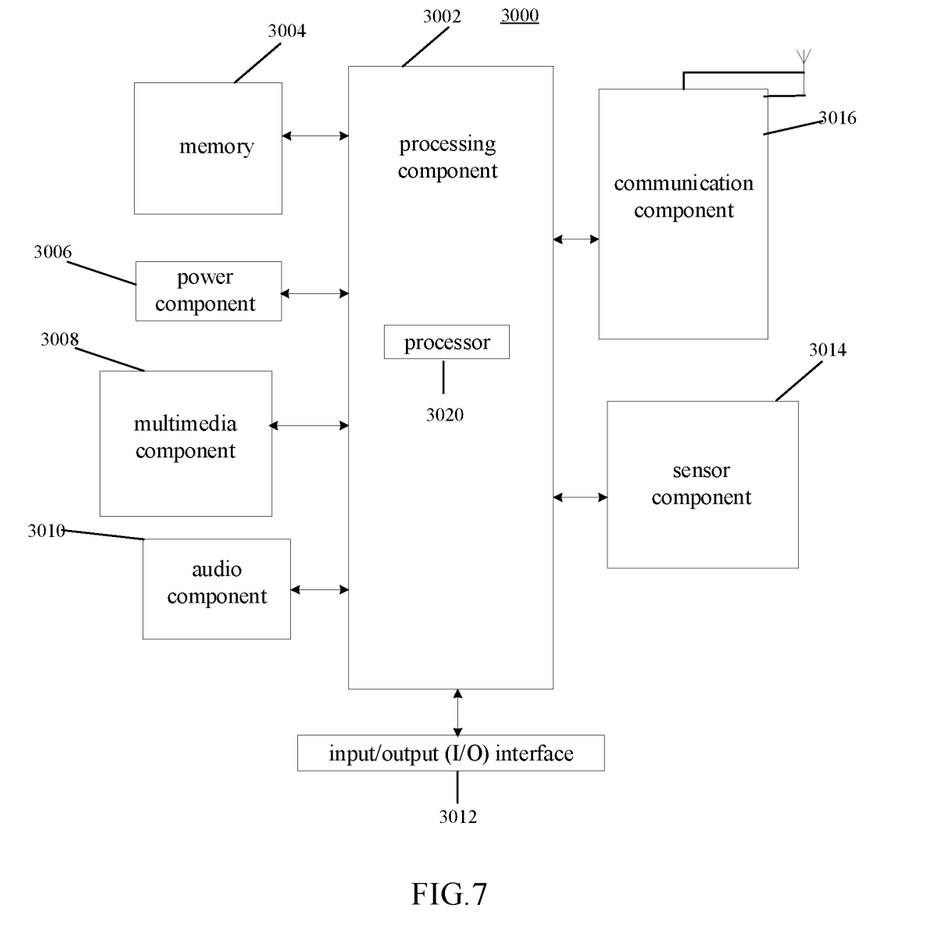
FIG. 7 is a block diagram showing a device for establishing a radio bearer according to an embodiment.

FIG. 7 is a block diagram showing a device 3000 for establishing a radio bearer according to an embodiment of the present disclosure. For example, the device 3000 may be a mobile phone, a computer, a digital broadcast terminal, a messaging device, a game console, a tablet device, a medical device, a fitness device, a personal digital assistant, and the like.

Referring to FIG. 7, the device 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the device 3000, such as operations associated with display, telephone calls, data communications, camera operations, and recording operations. The processing component 3002 can include one or more processors 3020 to execute instructions to perform all or part of the steps in the above described methods. Moreover, the processing component 3002 can include one or more modules to facilitate the interaction between the processing component 3002 and other components. For example, the processing component 3002 can include a multimedia module to facilitate the interaction between the multimedia component 3008 and the processing component 3002.

The memory 3004 is configured to store various types of data to support the operations of the device 3000. Examples of such data include instructions for any application or method operated on the device 3000, contact data, phone book data, messages, pictures, videos, and the like. The memory 3004 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 3006 provides power to various components of the device 3000. The power component 3006 can include a power management system, one or more power sources, and other components associated with the generation, management, and distribution of power for the device 3000.

The multimedia component 3008 includes a screen providing an output interface between the device 3000 and a user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3008 includes a front camera and/or a rear camera. When the device 3000 is in an operation mode, such as a photographing mode or a video mode, the front camera and/or the rear camera can receive external multimedia data. Each of the front camera and the rear camera may be a fixed optical lens system or have focus and optical zoom capability.

The audio component 3010 is configured to output and/or input an audio signal. For example, the audio component 3010 includes a microphone (MIC) configured to receive an external audio signal when the device 3000 is in an operation mode, such as a call mode, a recording mode, and a voice recognition mode. The received audio signal may be further stored in the memory 3004 or sent via the communication component 3016. In some embodiments, the audio component 3010 also includes a speaker for outputting the audio signal.

The I/O interface 3012 provides an interface between the processing component 3002 and peripheral interface modules, such as a keyboard, a click wheel, buttons, and the like. These buttons may include, but are not limited to, a home button, a volume button, a starting button, and a locking button.

The sensor component 3014 includes one or more sensors for providing status assessments of various aspects of the device 3000. For example, the sensor component 3014 can detect an open/closed status of the device 3000, relative positioning of components, such as the display and the keypad of the device 3000. The sensor component 3014 can also detect a change in position of one component of the device 3000 or the device 3000, the presence or absence of user contact with the device 3000, an orientation, or an acceleration/deceleration of the device 3000, and a change in temperature of the device 3000. The sensor component 3014 can include a proximity sensor configured to detect the presence of nearby objects without any physical contact. The sensor component 3014 can also include a light sensor, such as a CMOS or CCD image sensor, configured to use in imaging applications. In some embodiments, the sensor component 3014 can also include an accelerometer sensor, a gyroscope sensor, a magnetic sensor, a pressure sensor, or a temperature sensor.

The communication component 3016 is configured to facilitate wired or wireless communication between the device 3000 and other devices. The device 3000 can access a wireless network based on a communication standard, such as WiFi, 2G or 3G, or a combination thereof. In an embodiment, the communication component 3016 receives broadcast signals or broadcast associated information from an external broadcast management system via a broadcast channel. In an embodiment, the communication component 3016 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In the embodiments of the present disclosure, the device 3000 may be implemented with one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components and configured to perform the above method.

In the embodiments of the present disclosure, there is also provided a non-transitory computer readable storage medium including instructions, such as the memory 3004 including instructions executable by the processor 3020 of the device 3000 to complete the above described method. For example, the non-transitory computer readable storage medium may be a ROM, a random access memory (RAM), a CD-ROM, a magnetic tape, a floppy disc, an optical data storage device and the like.

Other embodiments of the present disclosure will be apparent to those skilled in the art from consideration of the specification and practice of the present disclosure disclosed herein. The present disclosure is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A method for establishing a radio bearer, comprising:
sending, by a first communication device, a connection establishment request message, wherein the connection establishment request message comprises: occupancy information of one or more first logical channel identifiers of a first user equipment (UE);
receiving, by the first communication device, a connection establishment message returned based on the connection establishment request message, wherein the connection establishment message comprises: one or more second logical channel identifiers, wherein the one or more second logical channel identifiers are selected from the one or more first logical channel identifiers based on the occupancy information by the second UE and are currently idle in both the first UE and the second UE; and
establishing, by the first communication device, a radio bearer between the first UE and the second UE based on the one or more second logical channel identifiers,
wherein the connection establishment message further comprises: at least one correspondence, and the at least one correspondence comprises a one-to-one correspondence between a first radio bearer configuration and a second logical channel identifier of the one or more second logical channel identifiers, and
wherein the method further comprises:
in response to determining that a second radio bearer configuration comprised in the connection establishment request message does not have a one-to-one correspondence between the second radio bearer configuration and the second logical channel identifier, establishing no radio bearer corresponding to the second radio bearer configuration.

2. The method according to claim 1,
wherein establishing the radio bearer between the first UE and the second UE based on the one or more-second logical channel identifiers comprises:
selecting the first radio bearer configuration corresponding to the second logical channel identifier according to the one-to-one correspondence between the first radio bearer configuration and the second logical channel identifier, and establishing the radio bearer between the first UE and the second UE.

3. The method according to claim 2, wherein the first radio bearer configuration of the radio bearer to be established is carried in the connection establishment request message, and wherein the first radio bearer configuration in the one-to-one correspondence between the first radio bearer configuration and the second logical channel identifier is the radio bearer configuration of the radio bearer to be established.

4. The method according to claim 1, wherein the occupancy information of the one or more first logical channel identifiers of the first UE comprises: an idle logical channel identifier in the first UE.

5. A method for establishing a radio bearer, comprising:
receiving, by a second communication device, a connection establishment request message, wherein the connection establishment request message comprises: occupancy information of one or more first logical channel identifiers of a first user equipment (UE);
selecting, by the second communication device, one or more second logical channel identifiers that are currently idle in both the first UE and the second UE from the one or more first logical channel identifiers based on the occupancy information;
establishing, by the second communication device, a radio bearer between the first UE and the second UE based on the one or more second logical channel identifiers; and
sending, by the second communication device, a connection establishment message, wherein the connection establishment message comprises: the one or more second logical channel identifiers,
wherein a radio bearer configuration of the radio bearer to be established is carried in the connection establishment request message; and
wherein the method further comprises:
in response to determining that the radio bearer configuration is not allocated to a second logical channel identifier of the one or more second logical channel identifiers, rejecting the radio bearer corresponding to the radio bearer configuration.

6. The method according to claim 5,
wherein the method further comprises:
allocating the radio bearer configuration to the second logical channel identifier.

7. The method according to claim 6, wherein the connection establishment message further comprises:
at least one correspondence, and the at least one correspondence comprises a one-to-one correspondence between the second logical channel identifier and the radio bearer configuration allocated to the second logical channel identifier.

8. The method according to claim 5, wherein the occupancy information of the one or more first logical channel identifiers of the first UE comprises: an idle logical channel identifier in the first UE.

9. A second communication device, comprising:
a processor;
a memory; and
an executable program stored on the memory and capable of being executed by the processor, wherein the processor is configured to execute the method according to claim 5 when running the executable program.

10. The second communication device according to claim 9
the processor is further configured to execute the following operation:
allocating the radio bearer configuration to the second logical channel identifier.

11. The second communication device according to claim 10, wherein the connection establishment message further comprises:
at least one correspondence, and the at least one correspondence comprises a one-to-one correspondence between the second logical channel identifier and the radio bearer configuration allocated to the second logical channel identifier.

12. The second communication device according to claim 9, wherein the occupancy information of the first logical channel identifier of the first UE comprises: an idle logical channel identifier in the first UE.

13. A first communication device, comprising:
a processor;
a memory; and
an executable program stored on the memory and capable of being executed by the processor,
wherein the processor is configured to execute the following operations when running the executable program:
sending a connection establishment request message, wherein the connection establishment request message comprises: occupancy information of one or more first logical channel identifiers of the first communication device;
receiving a connection establishment message returned based on the connection establishment request message, wherein the connection establishment message comprises: one or more second logical channel identifiers that are selected from the one or more first logical channel identifiers based on the occupancy information by the second communication device and that are currently idle in both the first communication device and the second communication device; and
establishing a radio bearer between the first communication device and the second communication device based on the one or more second logical channel identifiers,
wherein the connection establishment message further comprises: at least one correspondence, and the at least one correspondence comprises a one-to-one correspondence between a first radio bearer configuration and a second logical channel identifier of the one or more second logical channel identifiers, and
wherein the processor is further configured to execute the following operation:
in response to determining that a second radio bearer configuration comprised in the connection establishment request message does not have a one-to-one correspondence between the second radio bearer configuration and the second logical channel identifier of the one or more second logical channel identifiers, establishing no radio bearer corresponding to the second radio bearer configuration.

14. The first communication device according to claim 13, the processor is further configured to execute the following operation:
selecting the first radio bearer configuration corresponding to the second logical channel identifier according to the one-to-one correspondence between the first radio bearer configuration and the second logical channel identifier, and establishing the radio bearer between the first communication device and the second communication device.

15. The first communication device according to claim 14, wherein the first radio bearer configuration of the radio bearer to be established is carried in the connection establishment request message, and wherein first the radio bearer configuration in the one-to-one correspondence between the first radio bearer configuration and the second logical channel identifier is the radio bearer configuration of the radio bearer to be established.

16. The first communication device according to claim 13, wherein the occupancy information of the one or more first logical channel identifiers of the first communication device comprises: an idle logical channel identifier in the first communication device.

\* \* \* \* \*